Jan. 9, 1968 W. GOULD 3,362,276
COMPOSITE SEALING FASTENER
Filed Oct. 23, 1965

INVENTOR
WILLIAM GOULD
BY Howard C. Miskin
ATTORNEY

United States Patent Office 3,362,276
Patented Jan. 9, 1968

3,362,276
COMPOSITE SEALING FASTENER
William Gould, 93 Sagamore Road,
Milburn, N.J. 07041
Filed Oct. 23, 1965, Ser. No. 503,314
8 Claims. (Cl. 85—8.6)

ABSTRACT OF THE DISCLOSURE

An initially threadless composite nut having a deformable plastic sleeve within a ductile metal sleeve. The composite nut is passed over a male member and a compressive force is exerted on the metal sleeve whereby the plastic sleeve is permanently deformed to assume a configuration complementary to the configuration of the male member.

---

This invention relates to fastening devices and more particularly to nuts and still more particularly a fastening device having thread impressionable elastic material and which is useful as a nut for quick action attachment.

A nut according to the present invention is of simple design, is readily and inexpensively made and is easily used. It is strong, leak-proof, self-locking and completely eliminates the need for and the cost of threading. The only part required, in addition to the nut, is an externally threaded member, such as an ordinary bolt. The work pieces which are to be fastened together are generally apertured. A nut structure according to the invention will not mar or otherwise damage the workpiece with which it is used, will provide a fluid-tight seal and will be self-locking.

Furthermore, a fastening device according to this invention may be used with a bolt or threaded member of any of a plurality of thread sizes. For example, a fastening device made in accordance with the present invention suitable for use with a 6–32 bolt is equally useful with a 6–40 bolt. This reduces substantially the inventory of nut structures required.

A nut according to the present invention broadly comprises a body of thread impressionable elastic deformable material having a bore adapted to conform to and frictionally engage the external thread of an externally threaded member and be permanently deformed on the threaded member upon the application of an external squeezing force.

Advantageously, a nut structure according to the present invention has the thread engaging portion formed of a deformable rigid plastic material. One such material which has proved satisfactory according to the invention is a synthetic linear polyamide.

One object of the present invention is to provide a nut which instead of having to be screwed up the entire length of the projecting part of the bolt or threaded member, may be pushed freely along the threaded portion until engaging the wall of the workpiece and then tightened in place.

Another object of the present invention is to provide a nut structure for quick attachment, which is self-sealing and self-holding and which is made from plastic and metallic materials in a manner so that the nut structure has great holding power and durability.

A still further object of the present invention is to provide a nut structure having the advantages described above and which is of simple construction and is economically manufactured.

The above and other objects and advantages will appear from the following description of a preferred example of the invention, and the accompanying drawings of such example, wherein.

Figure 1:
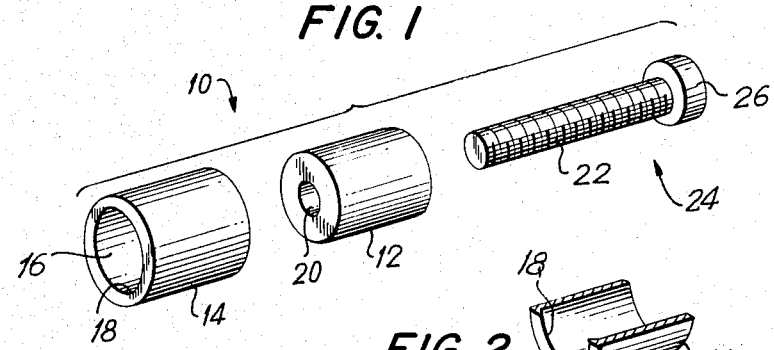
FIGURE 1 is an exploded perspective view showing a nut according to the invention and a bolt, prior to assembly of these parts with each other.
Figure 2:
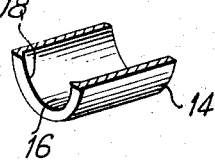
FIGURE 2 is a perspective sectional view of the metallic outer sleeve of the nut assembly shown in FIGURE 1.

Referring now more specifically to the drawings wherein like parts are designated by the same numerals throughout the various figures, a nut structure 10 embodying one form of the present invention is shown. Nut structure 10 includes an inner body member 12 formed from an impressionable material which is preferably a rigid thermo-plastic material, and an outer metalic member 14. Outer member 14, which telescopically receives member 12, has an axially extending bore 16 which frictionally engages the outer surface of inner member 12. Advantageously, member 14 has an interiorly directed radial lip 18 about one end of bore 16. Lip 18 aids in holding inner member 12 in axial position during the fastening operation. Inner member 12 has an axially extending, unthreaded bore 20 open at both ends. The axes of bores 16 and 20 define the axis of nut structure 10. Bore 20 is advantageously slightly greater than the outer diameter of the threaded portion 22 of threaded member 24, so as to freely slide over the threaded portion 22.

As shown in the drawings, threaded member 24 has a head 26 forming a bolt which shank passes through openings 28 and 30 in workpieces or panels 32 and 34, respectively. Head 26 of threaded member 24 engages a face 36 of piece 32 and nut structure 10 engages face 38 of work piece 34. Openings 28 and 30 are large enough to freely receive the bolt shank or threaded portion 22, but too small to receive head 26 or nut structure 10.

Figure 3:
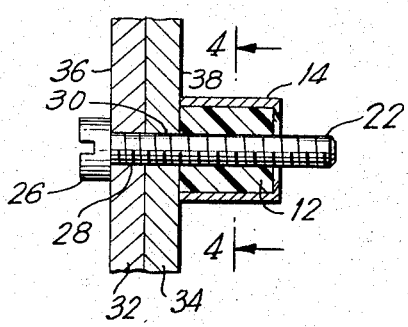
FIGURE 3 is a side-elevational, cross-sectional view showing the parts of FIGURE 1 assembled with each other and in a position to be fastened, and also showing a second or inner workpiece or panel positioned to be locked to a first workpiece.
Figure 5:
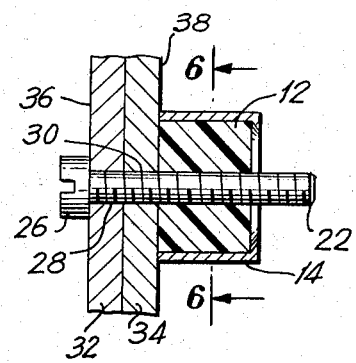
FIGURE 5 is a view similar to FIGURE 3, with the nut structure in the fastened position.
Figure 4:
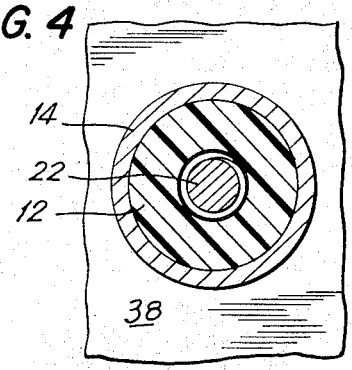
FIGURE 4 is an enlarged view taken on line 4—4 of FIGURE 3.

The nut structure 10 is adapted for use in an installation as shown in FIGURE 3. To join panels 32 and 34 together, bolt 24 is passed through openings 28 and 30 of panels 32 and 34 with bolt head 26 abutting face 36. Nut structure 10 is assembled by telescopically inserting inner member 12 into member 14. Nut structure 10 is slidably mounted on threaded portion 22 of bolt 24, extending from face 38 of piece 34 with the end of member 10 containing lip 18 being positioned remote from surface 38. Nut structure 10 is pushed along threaded portion 22 until it engages surface 38 of panel 34 as seen best in FIGURE 3.

Figure 6:
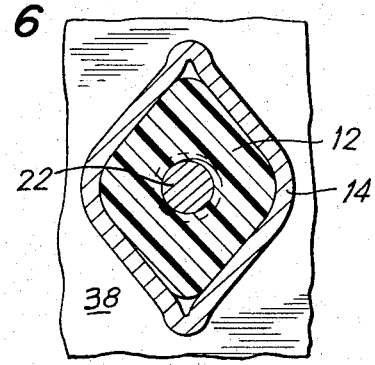
FIGURE 6 is an enlarged view taken on line 6—6 FIGURE 5.

While being urged toward panel 34, nut element 10 is compressively deformed in any convenient manner by a compressive tool, not shown, to the shape shown in FIGURE 6. Such tool may be a plier, such as a lock plier or cable clamp. Outer metal member 14 is deformed which in turn deforms inner member 12. As seen best in FIGURE 6, the plastic material of member 12 about bore 20 is permanently displaced to accommodate the threads of the threaded portion 22 of bolt 24, adjacent the zones about the crest of the thread and also adjacent the root of the threads and fills in the space between the convolutions of the thread and to fill and seal the space about opening 30 when the planar face of member 12 engages face 38 of panel 34. The displacement of the plastic material of member 12 about the threads of bolt 24 forms complementary helical screw threads in the wall of bore 20. These complementary screw threads securely grip the threads of the threaded shank thereby sealing bore 20 and locking nut structure 10 and bolt 24 against inadvertent relative movement.

Member 14 when deformed as described above, provides sufficient internal pressure on member 12 to produce and maintain positive clamping about the threaded portion of the bolt. Since member 14 and member 12, when deformed are non-circular in shape, they are locked against relative rotation.

Nut structure 10 when deformed as shown in FIGURE 1, may be removed by unthreading by means of a wrench, plier or other conventional tool. It will require more effort to unthread than a conventional type nut. The removal torque after several removals and reinsertions remains high. Bore 20 retains the complementary thread deformed therein and if nut structure 10 is reassembled with bolt 24, the thread impressed in bore 20 would still frictionally engage the threaded portion of bolt 24 to provide excellent sealing and locking characteristics. The nut structure is highly effective in retaining locking torque and is not appreciably removed or ground away by repeated mounting and dismounting.

While nylon has been found suitable for the material from which inner member or liner 12 is made, other similar type thermoplastic materials are satisfactory also. In particular, it has been found, at the present time, that such nylons commercially known as Du Pont FM 10001 and Du Pont Zytel 101 have great tensile strength and suitable physical, thermal and electrical characteristics for this purpose. Other materials may be used, including Zytel 105 nylon material (Du Pont Co.) which is particularly adapted for outdoor and marine use, "Lexan" polycarbonate plastic (General Electric) and others.

The outer metal sleeve is made from a non-brittle metal, such as soft steel, brass, or copper. It should be strong enough to retain its shape after deformation to maintain a positive inward pressure on the plastic sleeve.

While the drawings show that the length of outer sleeve 14 is about the same length as inner sleeve, advantageously, the inner sleeve 12 should extend beyond the end of sleeve 14 so as to engage the work surface only and avoid marring the surface by the metal outer sleeve.

Further, while the nut structure described herein is illustratively shown being used as a fastener for a bolt, the present invention may be used effectively with an undercut shaft a member having a convolution or annular groove therein, a roughened or knurled surface, a raised rib, a projection or a pin. The fastener taught by the present invention can be used on a shaft or member having an irregular surface or a portion of which the diameter or surface varies from the shaft surface. The device of the present invention is slidably mounted on the shaft and positioned over the surface which varies from the shaft surface, whether larger or smaller, and the device is radially compressed and deformed about this differing surface, so as to form a fastener without threading of the shaft or fastener. The surface which varies could be a rivet head extending from the shaft surface.

Additionally, since inner sleeve 12 is made of a plastic material, such as nylon, which has a relatively high dielectric constant, the metal sleeve 14 is insulated from the threaded member 24 and work piece 34. Further, the deformed plastic sleeve, forming a tight seal about threaded member 24, provides a corrosion resistant seal as well as a vibrationproof seal.

While outer member 14 is shown having an interiorly directed lip 18 to aid in retaining inner member 12, during assembly, lip 18 may be eliminated. Since sleeves 12 and 14 are preferably extruded shapes, the inner and outer diameters can be carefully determined and controlled. Advantageously, outer sleeve 14 and inner sleeve 12 may be telescopically positioned and retained in place by frictional engagement between their mating surfaces during assembly.

From the above description, it is seen that the present invention provides a novel nut structure which may be relatively easily and economically manufactured and which has effective self-sealing and self-locking characteristics, and provides insulation against galvanic corrosion and electric current. The metallic member and the plastic member are generally tubular and are easily extruded to the desired shape and dimensions.

Since many variations of the foregoing described device can be devised without departing from the spirit of the present invention, it is to be understood that the description is illustrative only and is not to be construed in a limiting sense, the present invention being defined solely by the appended claims.

What is claimed is:

1. A composite nut structure for self-sealing and self-locking around a threaded bolt comprising a metallic tubular cylindrical sleeve having a preformed axially extending opening therethrough and a rigid resilient plastic cylindrical sleeve telescopically disposed within said opening, said plastic sleeve having an axial bore of a diameter to slidably pass over the threads of said bolt, said plastic sleeve having an end extending longitudinally not less than a transverse edge of said metallic sleeve, said plastic sleeve being orientated relative to the bolt whereby said plastic sleeve end engages the work surface of the member through which the bolt extends, said sleeves being deformable in response to a flattening of a portion of said metallic sleeve by a predetermined radial compressive force exerted on said metal sleeve so that said plastic sleeve deforms permanently about and flows into the space between said threads of said bolt to form complementary helical convolutions and yieldably and sealably engage said threads.

2. The nut structure of claim 1 wherein said metal sleeve has an interiorly directed radial lip adjacent one end.

3. The nut structure of claim 1 wherein said metal sleeve consists of a ductile material.

4. The nut structure of claim 1 wherein said plastic sleeve consists of synthetic linear polyamide.

5. In combination a composite fastener on a shaft comprising a shaft having a first surface which varies from a second shaft surface, a metallic tubular sleeve having a preformed axially extending opening therethrough, and a rigid plastic tubular sleeve telescopically disposed within said metallic tubular sleeve opening, said plastic sleeve having an axial bore of a diameter to slidably pass over said first and second shaft surfaces, said plastic sleeve surrounding said first shaft surface, said plastic sleeve having an end extending longitudinally not less than a transverse edge of said metallic sleeve, said plastic sleeve being orientated relative to the shaft whereby said plastic sleeve end engages the work surface of the member through which the shaft extends, said metal sleeve being crimped on its outer periphery permanently deforming said rigid plastic sleeve about said shaft first surface and is locked in position.

6. The fastener of claim 5, wherein said first shaft surface is an annular groove.

7. The fastener of claim 5, wherein said first shaft surface is an upstanding rib.

8. The fastener of claim 5, wherein said first shaft surface is roughened.

References Cited

UNITED STATES PATENTS

| | | | |
|---|---|---|---|
| 2,122,839 | 7/1938 | Guy | 151—68 |
| 2,314,579 | 8/1955 | Staak | 85—36 |
| 2,807,083 | 9/1957 | Zillinocus et al. | 29—510 |
| 2,948,170 | 8/1960 | Kemp | 29—516 |
| 3,009,722 | 11/1961 | Augustin | 85—1 |
| 3,017,203 | 1/1962 | Macleod | 285—256 |
| 3,139,786 | 7/1964 | Ardell | 85—7 |
| 3,224,794 | 12/1965 | Crissy | 285—256 |

MARION PARSON, Jr., *Primary Examiner.*